Dec. 30, 1941.  G. M. DARBY  2,268,475
FLOCCULATION
Filed Sept. 30, 1939  2 Sheets-Sheet 1
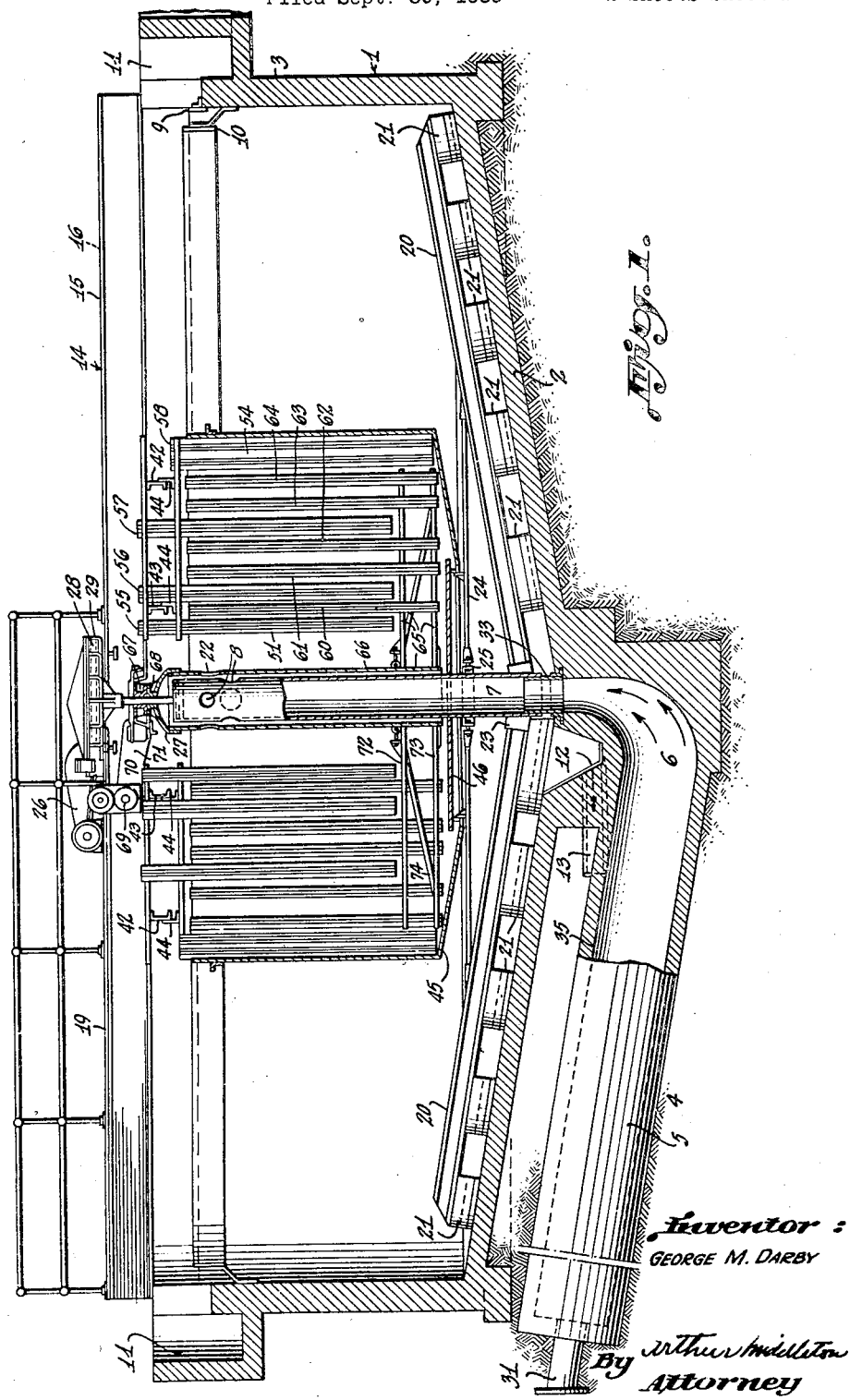
Inventor:
GEORGE M. DARBY
By Arthur Middleton
Attorney

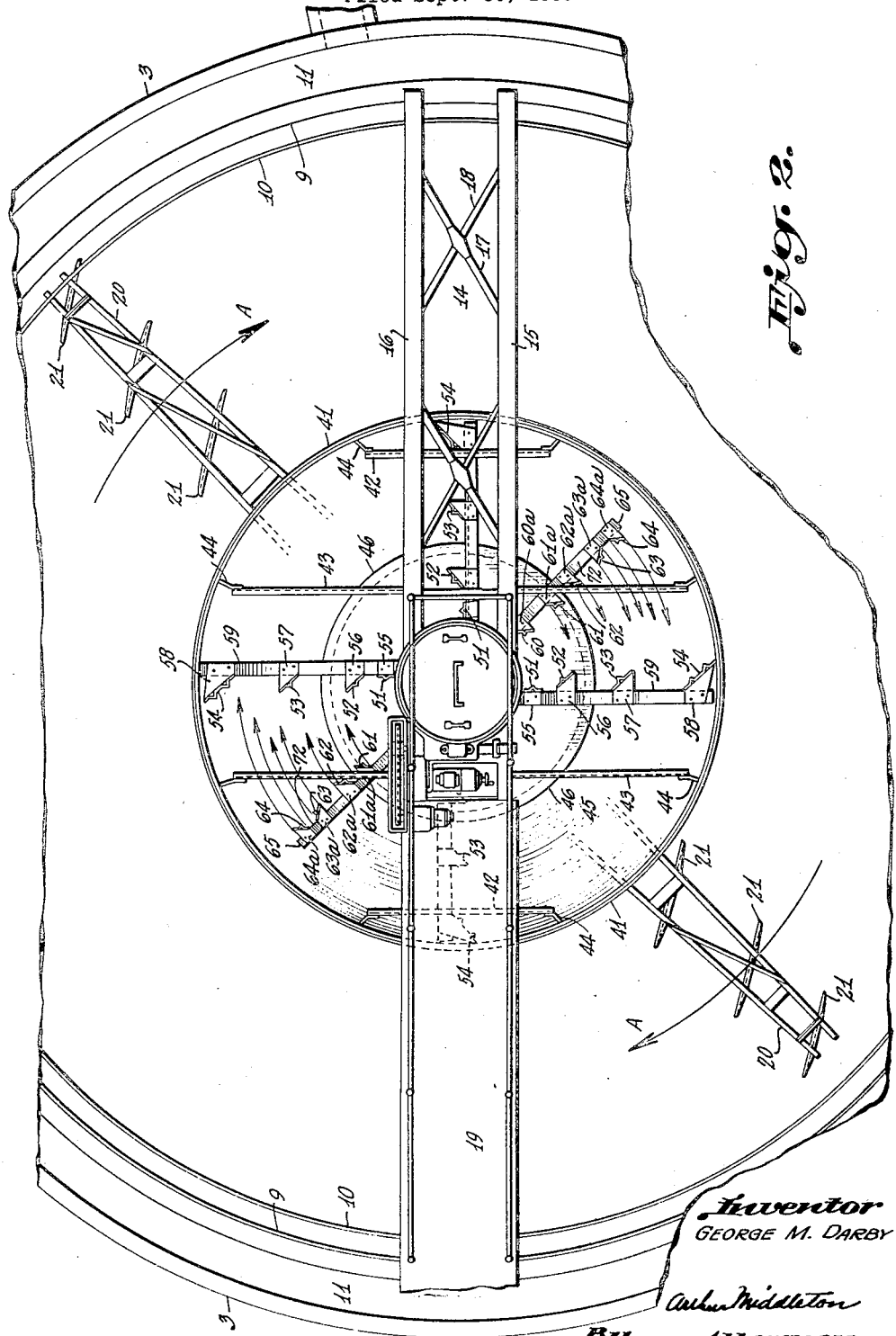

Patented Dec. 30, 1941

2,268,475

UNITED STATES PATENT OFFICE 2,268,475

FLOCCULATION

George M. Darby, Westport, Conn., assignor to The Dorr Company, Inc., New York, N. Y., a corporation of Delaware Application September 30, 1939, Serial No. 297,341

3 Claims. (Cl. 210—12)

This invention has to do with the conditioning of suspended solids that are to be removed from their carrying liquid for the clarification thereof.

In the clarification of turbid liquids, the particles of turbidity or supended solids are frequently removed by sedimentation. It has been found that the sedimentation processes are facilitated when the liquid to be clarified is first subjected to what has come to be called flocculation. This invention relates, then, to flocculation or a flocculation station for use in the treatment of liquid prior to sedimentation thereof.

In industry, many liquids must be clarified, such as water, sewage, trade-wastes, sugar juices, and the like. In some, it may only be a slight cloudiness or turbidity to be removed, whereas in others such as sewage the material to be removed may be inorganics ranging from grit down to the smallest particle size, and many types of organics.

Bearing in mind this wide range of liquids, it is obvious that solids to be removed by sedimentation range all the way from quick-settling material like sand and other inorganics as well as organics that settle only after a time, down to colloidal material, either inorganic or organic, that is difficultly settleable, as for example only after special treatment. So it is the function of a flocculation station to condition or otherwise render the difficultly settleable suspended solids into a phase wherein their settleability is improved. This is done by causing the smaller suspended solids to grow into flocs or floc colonies. Various means have been proposed for doing this, of which the U. S. A. patent to Smith, No. 1,893,451, is a very good example of what has been highly successful commercially. Most of these have been based on the theory that the way to form flocs is to cause a multitude of collisions between particles of turbidity that are strong enough to cause the particles to adhere to each other, and, at the same time, that are gentle enough so as not to disrupt or tear the flocs apart.

The Smith invention is based upon the use of agitative paddles revolving about horizontal axes whereby descending flocs and particles of turbidity are kicked upwardly or are continually swept upwardly into more or less horizontally flowing liquid. While this type of impelled liquid and floc-flow has been successful, I have found that effective flocculation can be had by subjecting liquid in a flowing-through zone or tank to flocculating treatment by moving flocculating blades that extend in direction substantially conforming to the liquid flow-path, and are adapted to impose on the liquid encountered thereby an impulse in a lateral and deflective direction from the blades, and further subjecting the liquid to reflector blades adapted to be engaged by a quantity of the liquid deflected from the flocculating blades for causing lateral reflection of the liquid.

The result thereof is to magnify and encourage a zig-zag motion of the liquid and particularly of its suspended solids so that collisions thereof are realized in planes that extend substantially at right angles to the general flow-path of the liquid through its treatment tank while at the same time minimizing any such deflection in planes that parallel said flow-path.

In other words, the agitative movements imparted to the liquid are such as tend to bring about a multitude of stimulated collisions between repeatedly laterally deflected solids in suspension or particles of turbidity while retardingly moving in a main or general flow-path that is at right angles to the plane in which the collisions are initiated. This is accomplished when using this invention by causing the particles to be repetitively deflected by blades, some of which are moving, with the blades set at a deflective non-right angle to the path of motion of the moving blades. This seems to cause the particles to be impelled hither and yon or to meander around in varying and continually changing horizontal directions if the blades be vertical or in vertical directions if the blades be horizontal, during the course of which meandering the particles receive repetitively or intermittently deflective impulses from the blades engaged thereby or which they engage, and are thus caused to travel at varying speeds.

Since the deflection of the particles of turbidity is to be, as far as possible, in planes at right angles to the general direction in which the flocculating blades extend, the flocculation station should preferably be fed with incoming liquid and have its flocculated liquid removed therefrom in a manner to cause a minimum of interference with the desired repetitive deflection. To that end, it is preferred to supply the incoming liquid to the flocculation station at one end section thereof, while removing flocculated liquid from the other end section of the flocculation station; but more specifically, I have found it exceedingly satisfactory to flocculate by using vertically disposed blades. I prefer to feed such a station in its upper region and flow the flocculated liquid from its lower region. The passage of liquid from feed inlet to discharge outlet with this arrangement is such as to permit the deflection of the particles of turbidity by the blades to continue in horizontal planes, since the retarded or controlled flow of liquid vertically through the flocculation zone seems to exert little influence on the direction of particle deflection. This invention, therefore, resides in method and means for accomplishing these objectives.

It is desirable to subject the flocculated liquid to subsequent treatment so as to effect an early elimination therefrom of the material which has been converted into condition favorable to settling or equivalent operation and this should be done without subjecting the flocs to substantial disintegration, particularly during its period of transfer to the initiating of the separating-out operation. In general this separating of the flocculated material from the liquid in which it is suspended is sequential to the flocculation operation and is attained by means of quiescent settling carried out within a sedimentation tank, or settling basin, or zone provided in what is known as a clarifier. The invention hereof is illustrated in connection with a flocculation station or compartment which is embodied in a combined type of apparatus embodying a flocculation zone delivering directly into a clarification or sedimentation zone as that in a preferred form of combined instrumentality and the construction thereof which is shown herein is also shown and described and particularly claimed in U. S. Patent No. 2,143,750, but it is to be understood that the invention hereof can be carried out in widely differing apparatus especially as to the solids separating-out features referred to. That is, the flocculation phase of this invention can be employed with other forms of solids separating-out instrumentalities besides those illustrated herein. The sedimentation tank may be viewed as broadly illustrating a means provided for receiving flocculated material that is delivered thereinto against a static head determined by a high point in the overflow means of the tank constituting part of a liquid transfer means that determines the normal functioning level of the liquid within the flocculation station and whereby as the result of feed of liquid to be flocculated into one end section of the flocculation station, such as into the top or upper portion thereof, there is a consequent vertical displacement along a general flowpath within the zone towards a discharge area or section vertically spaced from the receiving section, as for example, along a downward path towards and through a lower discharge area leading from the bottom of the flocculation station. Therefore, in considering the embodiment chosen for illustrative purposes herein the specific solids separating-out apparatus or sedimentation station should be broadly viewed as (1) an independent instrumentality for receiving and treating flocculated material and (2) for determining the normal level of the liquid undergoing flocculation within the flocculation zone. Insofar as the present invention is concerned the novel features of construction revolve about the flocculation station, the structural arrangement of the parts constituting the same and the novel flocculation treatment carried out therein and the sedimentation unit associated therewith is to be viewed as illustrative of such features as unnecessary to impart utility and completeness to the invention to which this case is directed.

In the accompanying drawings: Fig. 1 is a vertical sectional view of a flocculation station or apparatus designed for realizing the invention in combination with a sedimentation unit, and Fig. 2 is a plan view of the apparatus shown in Fig. 1.

The sedimentation basin or station is provided by a settling tank 1 shown as having a downwardly and inwardly sloping main bottom 2 and an upwardly extending marginal or boundary wall 3. This tank has associated therewith an influent supply or liquid-feeding means 4 which comprises an inwardly and relatively horizontally extending tubular section 5 leading to tubular sections 6 and 7, the latter of which is apertured at 8 whereby the apertured portions serve as feed delivery openings leading from the feed supply means and delivering liquid passing therethrough into the inner zone or flocculation station of the tank. The apertured portion of tubular section 7 constitutes a ported section providing influent discharge ports at the terminal of the influent supply means of which the tubular section constitutes a part. In the construction shown the tubular section 6 is in fact in the form of an elbow having a passageway therethrough which progressively decreases in cross-sectional area and the tubular section 7 provides an upflow conduit having the feed discharge apertures 8 leading from the upper portions thereof. The tubular sections 5, 6 and 7 constitute part of what is frequently referred to in this art as an inverted-syphon type of liquid feeding means leading to and delivering into a liquid-treating or sedimentation tank.

The tank has an overflow member 9 providing a weir that determines the normal operative level of the liquid within the tank and past which supernatant liquid overflows from the upper portion of the sedimentation zone into a marginal launder 11 from which the effluent overflow passes to any suitable place of use or to other place serving as a receiving space therefor. In order to prevent any floating debris or scum from entering the weir and pass into the launder 11, a circumferential ring or baffle 10 is fixed to the upper end of the wall 3. The upper edge of the baffle extends above the liquid level and is suitably spaced from the wall 3.

The bottom of the tank is constructed so as to provide a sump 12 suitable for receiving sedimented material passed thereto by a travelling sediment-transferring means provided as by a raking mechanism assemblage which operates over the tank bottom. This sump 12 constitutes a part of a structural portion or section which may be referred to as a sediment discharge means leading from the lower interior portion of the tank and in this connection it will be observed that a pipe 13 leading from this sump constitutes a part of said means and serves in the hydraulically conveying of sedimented material from the tank to any locality or place to which the sedimented material is to be passed.

In the apparatus shown, there is a beam or truss construction 14 extending across the tank and supported from opposite portions of the marginal wall of the tank. This beam or truss construction embodies a pair of channel or I-beams 15 and 16 connected by cross-tie members 17 and 18 constituting cross braces. The beams may be considered as further tied together by floor plates 19 that are disposed so as to provide a walkway from the marginal portion of the tank to operating mechanism located at or above the central portion of the tank.

The travelling means for impelling sediment to discharge from the tank is a very slowly moving means and in the construction illustrated is provided by an assemblage of raking mechanisms having or providing bladed elements that function over a bottom of the tank, the purpose of which is to engage sedimented material at the bottom of the tank and to impel and convey the sedimented material without rolling it, from diverse sections of the tank bottom toward and to the sump or sediment discharge section 12 as the raking elements turn in closed horizontal paths about a vertically extending axis.

This raking mechanism assemblage comprises outwardly extending rake-carrying arms 20 which embody or carry raking blades 21 providing sludge-engaging members that collectively constitute a sediment-raking element or sediment-raking elements and which function progressively to collect and transfer sedimented solids downwardly along the sloping floor until the solids transferred thereby are ultimately received into the sump or solids-receiving section 12 heretofore referred to.

The rake-carrying arms are in turn supported from a carrying shell or drum member that encompasses and is horizontally turnable about a vertically extending axis. The arm-carrying shell or carrier drum is embodied in or embodies the horizontally turnable tubular section 7 that provides the upflow feed conduit heretofore referred to and which, as already pointed out, constitutes a part of the influent feed means.

The rake-carrying arms 20 are arranged as a pair and extend in opposite directions from the arm-carrying shell 7. The inner ends 23 of the arms are connected to and carried from the lower end of this rotatable drum member and they derive further carrying support from the drum through the medium of tension rods 24 which can be adjusted as to length by the screws or bolts 25. In this way the elevation or position of the outer ends of the arms relative to the floor or bottom of the settling tank can be adjusted to a limited extent. The upper end of this drum is supported by and from a shaft 27 which in turn is supported from and through the medium of a turnable gear 28, constituting part of a motivated actuating mechanism 26, and which gear is in turn mounted on a stationary bearing member 29 carried by the beam or truss construction 14 heretofore referred to. A motivated mechanism having a gear suitable for rotatably driving and supporting the shaft 27 just referred to is shown in the Scott Patent No. 2,087,725 of July 20, 1937 and further description of the mechanism and parts by which the shaft 27 and the arm-carrying shell 7 may be turnably supported and operated in the required manner is not necessary in view of the disclosure in said patent.

Reverting now to the influent supply means, it will be noted that it also comprises a pipe end 31 that supplies liquid to be treated to the horizontally extending influent supply conduit means shown in section in the lower left-hand portion of Fig. 1. Feed supplied as influent through pipe having end 31 is delivered through a relatively straight flow unobstructed cylindrical passageway to a location whereat it is delivered directly into the elbow section 6 from whence the influent liquid passes into the upflow leg provided within the rotatable arm-carrying shell or member 7 heretofore referred to. In connection with the construction just referred to it will be noted that a fixed influent sealing member 33 provided on the elbow section 6 extends into and has overlapping relationship with respect to the lower end of the rotatable tubular member or arm-carrying shell 7 by which the upflow leg of the influent supply means is provided. The overlap of this influent seal is sufficient to prevent any substantial leakage of influent between the fixed member of the sealing construction and the lower end of the turnable arm-carrying shell 7.

The settling tank has a partial partitioning means functionally dividing the liquid-holding portion thereof into horizontally concentric inner flocculation and outer sedimentation zones or stations that are in constant hydraulic communication with each other through a submerged passageway area left by or in the partial partitioning means. This partial partitioning means in the construction shown embodies an intermediate wall or cylindrical baffle section 41 which is supported from the transverse beam or truss construction 14 through the medium of the horizontal transverse carriers provided by channel members 42 and 43 to which the wall 41 is connected as by means of the angle members 44. At the lower end of this cylindrical wall section 41 there is carried an annular floor portion 45. This annular bottom portion is preferably secured to the cylindrical wall 41 in a manner to make a relatively tight marginal joint, as by welding, and this bottom portion provides a central orifice or discharge passageway area through which said turnable arm-carrying shell 7 extends vertically. The partial partitioning means may also be considered as comprising a circular plate or baffle 46. This circular plate constitutes a floor member or section whose outer margin is spaced above and overlies the inner edge of the orifice and the annular bottom portion 45 just refererd to. In the construction shown this circular plate 46 is secured to and turns with the turntable arm-carrying shell 7 that carries the raking-arms 20 from a section below the circular plate 46.

The members 45 and 46 constitute the lower portion of the partial partitioning means and are vertically spaced above the main floor of the tank. Of these members the annular bottom portion 45 may be referred to as a stationary outwardly disposed bottom section having a central discharge opening and the member 46, which has been described as a circular plate or baffle, may be referred to as a central plate disposed at an elevation higher than that of the central discharge opening of the bottom section 45 whereby a baffled passageway is constantly left between the outwardly disposed bottom section and the central plate. In the construction shown the central plate 46 is supported independently of the outwardly disposed bottom section 45. The central plate 46 is horizontally turnable about a vertical axis and relative to said stationary bottom section 45, and has extent to a locality proximate the opening-defining edge of the bottom section 45 whereby there is realized and provided an endless non-obstructed passageway between the flocculation and sedimentation zones.

The cylindrical wall section 41, the annular bottom portion 45 and the circular floor plate 46 in effect provide the partial partitioning means which divide the interior of the settling tank into concentric inner and outer flocculation and sedimentation zones or stations that are in constant hydraulic communication through an annular outlet left in the bottom portion of the partitioning means.

In connection with the annular floor plate section 45 which is carried by and from the cylindrical wall of the partial partitioning means, it will be noted that this annular bottom member is coned, that it has a downward and inward slope. It is associated with the circular baffle member 46 in a manner whereby there is provided the annular orifice or outlet passageway within the partial partitioning means. As incoming liquid is fed into the flocculation zone there takes place a passage of liquid along a general flowpath that is vertical or downward into that portion of the liquid which is immediately below the flocculation zone but which constitutes a part of the body of liquid detained in the quiescent sedimentation zone. It also follows that incident to the feed within the flocculation zone and the displacement of the liquid therefrom into the sedimentation zone, there is a consequent and corresponding passing of supernatant liquid from the upper portion of the sedimentation zone and as overflow past the marginal weir 10 into the effluent launder 11 with which the tank is provided. Fixed baffle or bladed flow-reflecting or directing members 51, 52, 53 and 54, termed herein "reflector blades," are respectively carried by and depend from stationary baffle supports 55, 56, 57 and 58 which in turn are carried by channel members 59 that are in turn secured to the beams or truss construction 14. In the structural arrangement shown these stationary reflector bladed members or baffles extend vertically and are horizontally spaced at diverse radial distances from their vertical axis.

Within the flocculation zone or station there are also employed sets of movable vertically extending liquid-agitating blade assemblies or flocculating means that include such members as agitating or flocculating paddles or blades 60, 61, 62, 63 and 64 which extend from paddle-carrying arm structures 65 which in turn are carried by and extend radially from an outer turnable cage, drum or frame 66, that encircles or surrounds the arm-carrying shell 7. The paddle-carrying arm structure 65 and the turnable cage, drum or frame supporting the same may be collectively referred to as a horizontally turnable paddle support from which certain paddles extend vertically. The upper portion of this cage is apertured at 22, or provided with suitable openings, whereby incoming liquid passing the discharge openings 8 of the ported section of the tubular rake arm carrier 7 can pass into the liquid-holding portion of the inner flocculation zone. The upper end of the outer turnable structure or horizontally turnable paddle support has a ring gear 67 which is turnably supported upon a stationary bearing member 68 that in turn derives support from the transverse beam or truss construction 14. The outer structure turns about a vertically extending axis that is concentric with the axis about which the rake-carrying arms turn and it is actuated by any suitable motivating mechanism 70 such as one employing a motor 69 operating through the medium of speed reducing and power transmission gearing 71 and preferably regulatable in a manner whereby the velocity of turning movement of the outer turnable structure and thus of the flocculating blades carried thereby, can be adjusted to the proper operative requirements, to wit, at such a rate as will produce agitation conducive to floc formation and floc amassment within the flocculation zone or station. The frame or structure 65 by which these movable flocculating paddles or blades 60, 61, 62 and 63 are supported from the turnable outer structure is shown as comprising upper and lower radial members 72 and 73 and tension member 74, whereby a suitably braced paddle-carrying arm is formed. The vertically extending flocculating paddles 60 are mounted by being secured at the lower ends thereof to said rotating paddle-supporting arm or frame 65. It will be noted that the stationary bearings, by which the sediment-raking assemblage and the flocculating means are carried, are located above the normal level of the liquid, which level is determined by the overflow weir of the effluent withdrawal means.

The agitating paddles 60, 61, 62, 63 and 64 move as sets in repetitive or circular paths in the general direction indicated by the arrow A and thus in general parallel to or conforming to the general flow-path of the liquid through the flocculation zone or station. This general direction will be referred to as the direction of forward movement of the flocculating mechanism.

Of the stationary bladed members 51, 52, 53 and 54 it will be noted that the rear face of each blade 51 extends inwardly and rearwardly and that the rear faces of the other blades 52, 53 and 54 extend inwardly and forwardly, or as otherwise expressed, the rear face of each blade has a forward and lateral slant. Each of these cooperative stationary blades, by the rear face portions thereof, while not normally movable, are relied upon essentially to retard and particularly to reflect the moving liquid engaged or encountered thereby whose movement is induced or impelled by the front face portions of the forwardly movable paddles 60, 61, 62, 63 and 64 that in moving give impulses to the liquid encountered thereby. Each movable paddle 60 has a rearward inward slope, or as otherwise expressed, a rearward lateral inclination or slant, and passes through the fixed space provided between stationary blades and tends to impel liquid deflectively forwardly and inwardly as toward a fixed laterally reflecting and retarding blade 51. Each movable paddle 61 and 62 has a rearwardly and inwardly extending front face portion. These paddles 61 and 62 move as a set forwardly and to and through the space between the fixed reflecting blades 52 and 53. The movable set of blades or paddles thus are at a non-right angle to their path of motion and the stationary reflector blades are oppositely angled. The tendency of the directed flow is forwardly and laterally because of the forward and inward extent of the fixed reflector blades 52 and 53 and of the rearward and inward extent of the movable flocculating paddles 61 and 62. This forward and lateral tendency creates a reflected flow in the form of an outward and forward current flow which will lead to and tends toward the removal of material which might otherwise have a tendency to collect as sediment on the circular plate or floor portion 46. The movable paddles 63 and 64 are arranged so that the forward face portions converge rearwardly toward each other and thus as they move forward they tend to impel and deflect the liquid engaged thereby into the space between them. These two paddles move forwardly and through the space between the fixed blades 53 and 54. This results in a different type of flow action and flow movements within the outer portion of the flocculation zone and incident to this forward movement there is a sufficient but gentle disturbance of a character to tend to maintain a relatively clear flow area on the annular floor section 45.

As the majority of the movable flocculating paddles 60, 61, 62 and 64 have forward faces which slope rearwardly and inwardly and as the majority of the stationary reflector blades 52, 53 and 54 have rear faces which slope forwardly and inwardly they conjointly function due to their angularity, to cause the liquid agitated and reflected thereby to tend to move horizontally and thus some toward the source of feed or delivery of liquid as it is introduced into the flocculation zone. In other words, this agitation is of a type which brings at least some of the formed or developing flocs into the region of the incoming liquid.

In order to impart stiffness to each of the fixed bladed members 51, 52, 53 and 54 and to each of the movable paddle members 60, 61, 62, 63 and 64 there has been provided at least one vertically extending rib or protruding section which is indicated by the single protruding portion at the rear face of fixed blades 51, 52 and 53 and by the double protruding portion at the rear face of the fixed blade 54, and by the single protruding portion on the forward face of each of the movable paddle members 60, 61, 62, 63 and 64.

It will be noted in connection with the structure just described that the movable paddles above referred to move to impart the desired agitation to the liquid within the flocculation zone and that the paddle-supporting arms incident to the movement aid in imparting flow movements to the liquid in the lowermost region of the flocculation zone whereby there is avoided any objectionable retention of solids on the bottom section of the flocculation zone provided by the partial partitioning members. Also incident to the turning movement of this mechanism there is a production of flow currents which tend to aid in the movement of flocculated material downwardly and inwardly along the annular sloping bottom portion 45 whereby a desired operation of the apparatus will be effectively and efficiently maintained.

By the operating of the flocculating mechanism described, at the usual flocculating velocity not to exceed substantially 1.5 feet per second, floc nuclei and flocs are first amassed or coagmented or integrated but in this phase they may be difficult to settle, so it becomes important to condition them for settleability. And this seems best accomplished by sweeping into the incoming feed liquid a multitude of flocs that already has attained settleable characteristics. To that end, the blades are tilted or set at an inclined angle to their path of motion whereby settling flocs are deflected angularly or laterally to the path of the movable blades. Indeed, this arrangement of movable flocculating and of reflective fixed angled blades seem to impose successive and repetitive horizontal lateral deflectional motion to the flocs or particles of turbidity suspended in the water being treated, for thus insuring a multitude of collisions therebetween in planes substantially at right angles to the general liquid flowpath through the flocculating station, or substantially at right angles to the flocculating and reflector blades (since the blades are parallel or at least conform to said flowpath). Sloping or inclining of the stationary blades or baffles in the opposite direction also aids in this conjoint deflection and reflection of the liquid and its flocs in the flocculation zone to receive a maximum of horizontal lateral deflection or displacement while receiving a minimum of vertical displacement due to the fact that horizontal deflection is stimulated by the positive deflectional action of the movable angularly inclined blades and the reflectional action of the fixed inclined blades on the flocs while vertical movement is retarded due to the controlled rate of introducing of new feed liquid to the flocculation zone and its removal therefrom through the medium of outlet means having a high point that fixes the liquid level in the flocculation station. This outlet means, from this aspect, is provided by the surrounding sedimentation zone and the overflow weir 9 thereof.

Whereas, there has been described and shown herein that one set of blades is movable while the other set is stationary, since the movable set only needs the reflective cooperation of the other set, the other set could, of course, also be moved, so long as it is moved at a differential rate or in a different direction. Also, whereas the movable blades have been described as being rotatable about a center of motion, it is entirely possible that their path of motion be not circular, the important feature being that their front or forward faces lie at an obtuse angle to their path of motion, while the cooperating faces of the other blades be cooperatively deflective or reflective by lying at an acute angle to the path of motion of the movable blades, for thus is obtained the desired successive and repetitive angular deflection of the liquid and its suspended particles engaged by the blades, with that deflection being in substantially at right angles to the general flowpath of the liquid flowing through the flocculation station, for such it is that produces efficient flocculation in accordance with this invention.

I claim:

1. In the clarifying of liquid having therein flocculatable suspended solids and especially those not normally settleable, a method for converting such solids into settleable flocs comprising establishing and marginally confining a body of such liquid; supplying and delivering incoming feed liquid thereto at one elevation; removing from another elevation thereof liquid in quantity equal to the incoming liquid for realizing a continuous vertical flow movement; and during said continuous vertical flow movement horizontally zigzagging the suspended solids of the liquid for coagmenting such solids into flocs and for developing such flocs into settleable form by imposing on them while they descendingly traverse horizontal planes general substantially horizontal flow movements attained by moving in the body in repetitive horizontal paths about a vertically-extending axis vertically-extending horizontally-spaced-apart paddles having forward liquid-impelling surfaces horizontally slanting with respect to their forward paths of movement at rates not substantially in excess of 1.5 feet per second and conducive to floc formation as well as development and being moved in direction repetitively past vertically-extending horizontally-spaced-apart deflecting blades having rear faces disposed in opposition to the front faces of the paddles, the deflecting blades thus being engaged by the paddle-impelled liquid suspension whereby the blades horizontally reflect the impelled liquid.

2. In the treating of liquid having therein flocculatable suspended solids and especially those not normally settleable so as to convert such solids into settleable flocs, the method which comprises establishing and marginally confining a body of such liquid by supplying incoming liquid thereto at one elevation and passing liquid in quantity equal to the incoming liquid from another general elevation for realizing a continuous general vertical flow of liquid, and during said vertical flow movement horizontally zigzagging solids suspended in the liquid for coagmenting the solids into settleable flocs by (a) imposing on the solids bearing liquid horizontal flow movements having forward and lateral components attained by gently moving in the body in repetitive horizontal paths about a vertically-extending axis vertically-extending horizontally-spaced-apart paddles having liquid-impelling faces disposed at an angle to their paths of horizontal movement and moving the paddles at rates not substantially in excess of 1.5 feet per second and conducive to floc formation as well as conditioning and (b) by successively deflecting the thus impelled solids bearing liquid with a degree of force that discourages substantial floc disintegration by vertically-extending horizontally-spaced-apart deflecting blades having surface portions disposed to horizontally reflect the liquid suspension impelled thereagainst by the paddles as the latter move horizontally relative to and past the deflecting blades. blades.

3. Apparatus for treating liquid having therein suspended flocculatable solids and especially those not normally settleable for coagmenting the solids into settleable flocs; comprising in operative combination a tank; a wall marginally defining a section providing a flocculation zone for treatment of liquids therein; means for delivering incoming liquid to said section at one elevation thereof; means providing a flow passageway for flocculated liquid suspension leading from an elevation thereof vertically spaced a substantial distance from the first mentioned elevation from another elevation thereof whereby there is a transit of liquid through said zone generally vertically; and means for coagmenting suspended solids into flocs as well as for conditioning flocs for settleability as they descend within said flocculation zone comprising vertically-extending horizontally-spaced-apart liquid-splitting paddles movable at speeds not substantially in excess of 1.5 feet per second along horizontal paths about a vertically-extending axis with the paddles having forward faces disposed at angles to their horizontal paths of movement, vertically-extending reflecting blades having rear faces disposed in opposition to the front faces of the oncoming paddles and angularly disposed with respect to the horizontal paths of movement of the movable paddles for reflecting liquid impelled thereagainst by the paddles, which said reflecting blades are spaced far enough apart and disposed with respect to the paths of movement of the impelling paddles to permit turning movement of the impelling paddles relative to and past the reflecting blades whereby due to the angularly disposed faces of the agitating paddles liquid containing suspended solids engaged by the paddles is impelled substantially horizontally therefrom to encounter said angularly disposed rear faces of the reflecting blades, liquid with its solids thus being successively impelled and reflected in diverse substantially horizontal meandering directions as the paddles rotate; and means for imparting horizontal turning movements to the paddles relative to and past the deflecting blades at speeds relative to the latter such that the force applied discourages substantial floc disintegration and the resulting horizontally meandering flow movements are conducive to the development of flocs as well as to the conditioning of the flocs into settleable phase.

GEORGE M. DARBY.